(12) United States Patent
Eromäki

(10) Patent No.: US 6,510,588 B2
(45) Date of Patent: Jan. 28, 2003

(54) TURNING MECHANISM FOR PROVIDING TURNING MOTION, AND HINGED ELECTRONIC DEVICE

(75) Inventor: Marko Eromäki, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 64 days.

(21) Appl. No.: 09/865,118

(22) Filed: May 24, 2001

(65) Prior Publication Data

US 2002/0002884 A1 Jan. 10, 2002

(30) Foreign Application Priority Data

May 30, 2000 (FI) .............................................. 20001295

(51) Int. Cl.⁷ .............................. E05F 1/08; E05D 11/08
(52) U.S. Cl. ............................. 16/308; 16/342; 16/295; 16/304; 16/306; 16/54; 16/50; 16/280; 16/285; 361/680; 361/683
(58) Field of Search ........................ 16/308, 290, 295, 16/304, 306, 307, 342, 54, 50, 378, 280, 285; 361/680–683; 248/917–920, 922, 923; 403/111, 120

(56) References Cited

U.S. PATENT DOCUMENTS

| | | | |
|---|---|---|---|
| 4,358,870 A | 11/1982 | Hong ............................. | 16/53 |
| 4,574,423 A | 3/1986 | Ito et al. ......................... | 16/85 |
| 4,614,004 A | 9/1986 | Oshida .......................... | 16/82 |
| 4,721,310 A | 1/1988 | Gavagan et al. ........... | 296/97 H |
| 5,142,738 A | 9/1992 | Ojima .......................... | 16/306 |
| 5,165,145 A * | 11/1992 | Sherman ...................... | 16/303 |
| 5,165,507 A * | 11/1992 | Ohshima ...................... | 16/52 |
| 5,382,108 A * | 1/1995 | Ojima .......................... | 16/308 |
| 5,566,048 A | 10/1996 | Esterberg et al. ........... | 361/681 |
| 5,566,424 A * | 10/1996 | Crompton et al. ............. | 16/337 |
| 5,572,768 A * | 11/1996 | Daul ............................ | 16/337 |
| 5,636,275 A | 6/1997 | Takagi et al. ................ | 379/433 |
| 5,682,645 A | 11/1997 | Watabe et al. ................. | 16/338 |
| 5,771,540 A * | 6/1998 | Carpenter et al. ............. | 16/299 |
| 5,799,371 A * | 9/1998 | Lin .............................. | 16/303 |
| 6,070,494 A * | 6/2000 | Horng .......................... | 16/337 |
| 6,085,388 A * | 7/2000 | Kaneko ........................ | 16/274 |
| 6,125,559 A * | 10/2000 | Mullenhour ................. | 172/816 |
| 6,317,927 B1 * | 11/2001 | Lai et al. ...................... | 16/338 |

FOREIGN PATENT DOCUMENTS

| | | |
|---|---|---|
| DE | 2329073 A * | 1/1975 |
| EP | 0396354 A2 | 11/1990 |

OTHER PUBLICATIONS

Japanese Patent document No. JP11141536, English translation of the Abstract attached.
Japanese Patent document No. JP2000145269, English translation of the Abstract attached.

* cited by examiner

Primary Examiner—Chuck Y. Mah
(74) Attorney, Agent, or Firm—Perman & Green, LLP

(57) ABSTRACT

A turning mechanism for providing a turning motion, and a hinged electronic device. The turning mechanism comprises a power element which is arranged to generate the turning force for the turning motion, and a damping element which is arranged to control the speed of the turning motion. The damping element comprises a substantially cylindrical casing inside of which a spindle is mounted using a clearance fit. The power element is connected with respect to the spindle to allow the spindle to rotate inside the casing along with the turning motion. The clearance fit between the casing and the spindle is provided with an elastic medium which controls the motion of the spindle with respect to the casing and dampens the stopping of the turning motion.

33 Claims, 3 Drawing Sheets

TURNING MECHANISM FOR PROVIDING TURNING MOTION, AND HINGED ELECTRONIC DEVICE

BACKGROUND OF THE INVENTION

1. Field of the Invention

The invention relates to a turning mechanism for providing a turning motion, the mechanism comprising at least one power element which is arranged to generate the turning force for the turning motion, and at least one damping element which is arranged to control the speed of the turning motion.

The invention further relates to a hinged electronic device which comprises at least a first part and a second part arranged to turn with respect to the first part.

2. Brief Description of Related Developments

Folding electronic devices are known which comprise a base part and a turning cover part which is attached to the base part and can be turned by means of hinges. The above-mentioned electronic devices are typically e.g. mobile phones, communicators, portable computers, laptops, palmtops or other similar devices. The base part and the cover part of the device can be folded against each other to facilitate carrying and handling of the device, for example. On the other hand, by opening the device into its use position, i.e. by turning the cover part apart from the base part, we obtain a screen the size of which usually equals the size of substantially the whole cover part, and a keyboard the size of which equals the size of substantially the whole base part. Naturally, the device may comprise more than two parts which turn with respect to each other.

To increase the ease of use, the hinge structure of the device can be provided with opening elements which facilitate the opening motion, such as springs which generate the opening force needed to turn the parts into the use position, i.e. when the locking that locks the parts against each other is released, the opening elements force the parts open. To guarantee a reliable opening motion in every situation, the opening members are made rather strong. This results in a rapid opening motion, which often causes a loud and unpleasant sound as the parts hit the limiters of the opening motion. Opening of the device is not particularly pleasant and does not give a good impression of the quality of the device in this respect. In addition, a sudden stop of a strong and rapid movement may stress and even break device components, which naturally causes inconvenience and costs to the user. The stress is particularly high when the cover part is relatively heavy and the opening element strong. Naturally, the structures of the device can be dimensioned to withstand the stress caused by the opening motion better, but in that case the other operating characteristics of the device may suffer, the weight and size of the device will increase and the price rise.

Solutions are also known e.g. from household appliances and automotive engineering which comprise opening members and damping elements for slowing down the opening motion. For example, U.S. Pat. No. 4,614,004 discloses a solution in which a rotor rotating in a cylinder filled with liquid brakes the opening motion of a lid opened by spring force in a cassette recorder or the like. To achieve sufficient damping, a transmission ratio is provided between the lid and the rotor by means of cogwheels. U.S. Pat. No. 4,721,310 discloses an opening mechanism in which springs pull open the lid of a vanity mirror mounted in the visor of a vehicle. The edge of the lid is pressed against a flexible counter surface along which the edge of the lid moves, thus braking the opening motion. These solutions are functional as such but since their structures are relatively complex and large, they are unsuitable for small electronic devices the size of which will still decrease. Particularly if the electronic device comprises more than two hinged parts, the structure will be rather complicated and expensive.

An object of the present invention is to provide a folding electronic device in which the opening or closing mechanism functions in a controlled manner. A further object of the invention is to provide an opening or a closing mechanism which needs a small amount of space and has low production costs. It should be noted that hereinafter in this application the term device is used to refer to hinged electronic devices.

SUMMARY OF THE INVENTION

The turning mechanism of the invention is characterized in that the damping element comprises a substantially cylindrical casing, that a spindle is mounted inside the casing using a clearance fit, the spindle being connected to the power element to allow relative rotational movement between the spindle and the casing along with the turning motion, and that the clearance fit between the casing and the spindle is provided with an elastic medium which controls the turning motion of the casing with respect to the spindle and dampens the stopping of the turning motion.

The electronic device according to the invention is characterized in that the device comprises a turning mechanism for turning the first part with respect to the second part, that the turning mechanism comprises a power element which is arranged to generate the turning force for the turning motion, and a damping element which is arranged to control the speed of the turning motion and which substantially comprises a cylindrical casing inside of which a spindle is mounted using a clearance fit, the spindle being connected to the power element so that the spindle rotates with respect to the casing along with the turning motion, and that the clearance fit between the casing and the spindle is provided with an elastic medium which controls the turning motion of the casing with respect to the spindle and dampens the stopping of the turning motion.

The basic idea of the invention is that the turning motion caused by the power element of the turning mechanism is slowed down with a damping element which comprises a casing, a spindle with a clearance fit which is arranged inside the casing and rotates with respect to the bushing along with the motion, and an elastic medium which is placed between the bushing and the spindle and controls the rotation of the spindle with respect to the bushing so that the parts of the device turn with respect to each other suitably slowly and so that this motion stops in a smooth and controlled manner. The idea of a preferred embodiment is that the power element is integrated into the damping element to allow the elastic medium both cause the turning motion and slow down the turning motion and the stop thereof The idea of a second preferred embodiment is that the spindle is substantially round in cross-section and that the elastic medium is elastic adhesive material which sticks onto the casing and/or the spindle, preventing their free rotation with respect to each other. The idea of a third preferred embodiment is that the power element used as the source of the turning force is a spring, preferably a torsion spring, which is arranged substantially parallel with the damping element and preferably so that the torsion spring simultaneously functions as the hinge pin of at least one hinge.

An advantage of the invention is that the turning mechanism is small and thus easy to mount in small devices, too.

The structure of the turning mechanism is very simple, and consequently its production and assembly costs are low and its function reliable. The substantially round spindle is very simple to produce, and the elastic medium consisting of acrylic adhesive can be installed in the damping element without difficulty; furthermore, its damping property remains substantially the same from one turn to another. Thanks to its shape, the torsion spring is easy to mount in the device so that it takes as little space as possible. The hinge pin integrated into the torsion spring decreases the number of components in the device and thus also the costs resulting from the components.

BRIEF DESCRIPTION OF THE DRAWINGS

The invention will be described in greater detail in the accompanying drawings, in which.

DETAILED DESCRIPTION OF THE PREFERRED EMBODIMENT(S)

Figure 1:
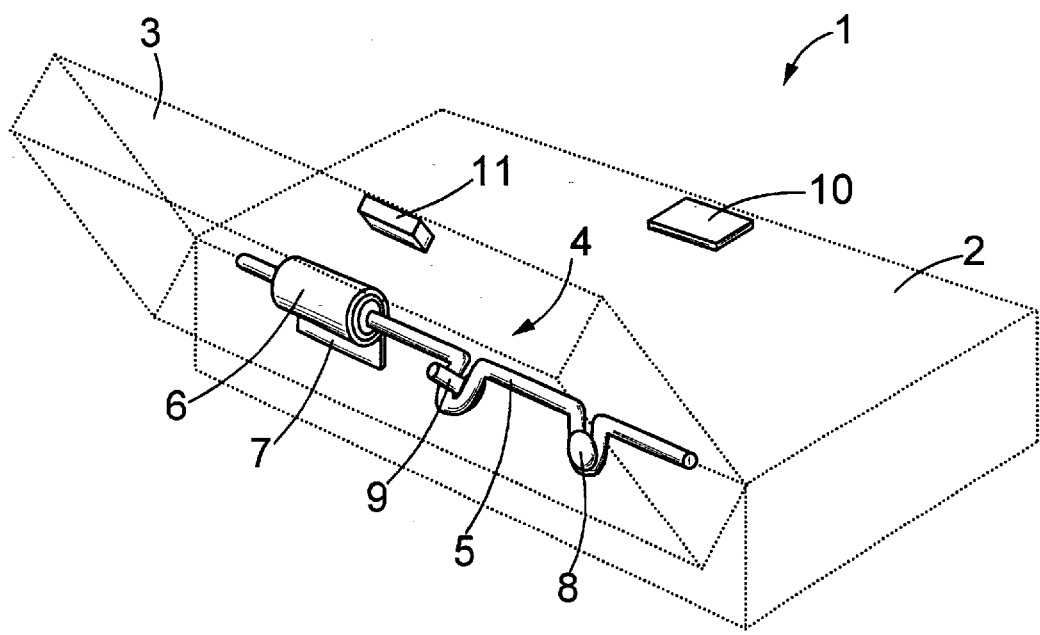
FIG. 1 is a schematic perspective view of an embodiment of the device according to the invention.

FIG. 1 is a perspective view of an embodiment of the device according to the invention. The device 1 comprises a base part 2 and a cover part 3 which are arranged to turn with respect to each other by a hinge structure, which is not shown in the figure to simplify the illustration. The base part 2 usually comprises the main keyboard of the device and the cover part 3 the main screen, but the components can also be arranged otherwise. The device 1 is provided with a turning mechanism 4 which opens parts 2 and 3 from the folded position into the use position, in which the device 1 is shown in FIG. 1. The device 1 comprises locking members 10, 11 with which the device 1 is locked in the folded position; when the locking is released, the turning mechanism 4 turns the parts into the use position. The locking members 10, 11 as well as the limiting members which define the opening angle of the use position can be implemented in manners known per se by a person skilled in the art, for which reason they will not be described in greater detail here.

The turning mechanism 4 comprises a power element 5 and a damping element 6 arranged substantially parallel therewith. The power element 5 generates the force needed for opening the device from the folded position into the use position. In the embodiment illustrated in FIG. 1 the power element 5 is a torsion spring which is attached to the base part 2 with a first attachment member 8 and to the cover part 3 with a second attachment member 9. The torsion spring is a spring member known per se and its spring force is generated by rotating the spring around its longitudinal axis. The torsion spring is made of steel, for example, or of another known material used in springs. In the embodiment illustrated in FIG. 1 the attachment members 8, 9 are screws, but the attachment can also be implemented otherwise, e.g. by gluing, welding, with plastic snap pins or hooks or in other similar ways known per se. The power element 5 may be some other element than the torsion spring, which will be discussed more closely in connection with FIG. 6. One end of the power element 5 is provided with a damping element 6, which is arranged parallel with the power element and attached to the base part 2 with a clamp 7. The damping element 6 can also be attached e.g. with a screw or with another fastening element known per se, or by gluing, welding, pressing or in another similar manner. It should be noted here that the dimensions between the characteristics and the details illustrated in the figures are only exemplary. The device 1 may comprise more than one damping element 6: both ends of the power element 5, for example, may be provided with a damping element 6. The length of the damping element 6 may also correspond to the width of the whole device 1.

Figure 2:
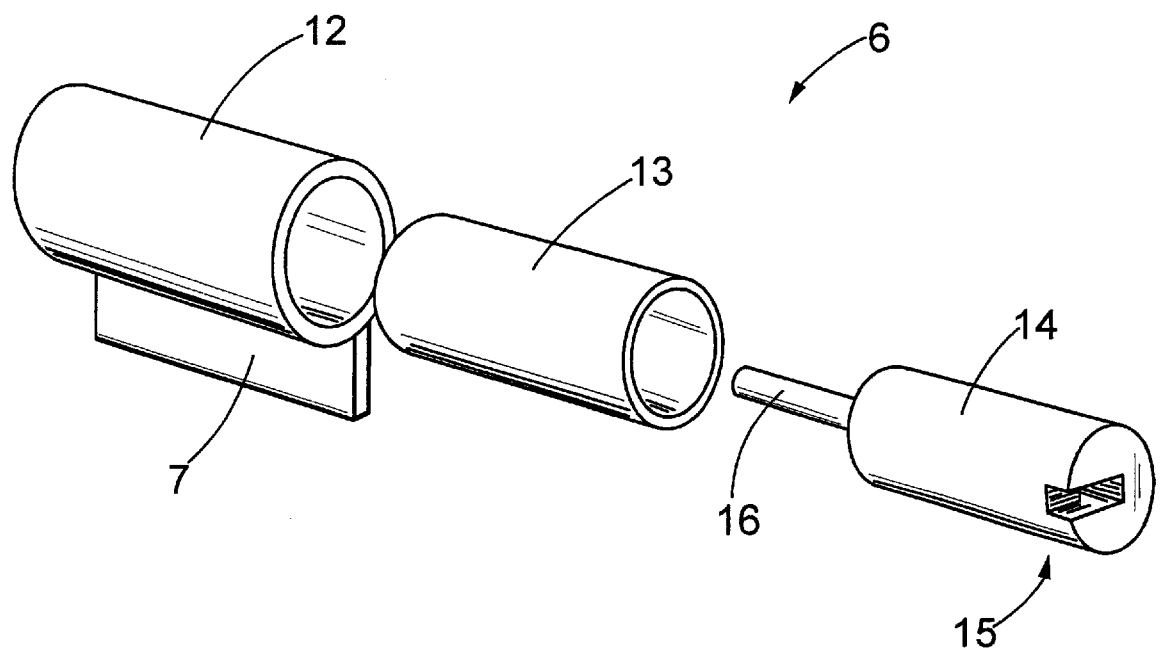
FIG. 2 is a schematic perspective exploded view of an embodiment of the damping element in the turning mechanism according to the invention.

FIG. 2 is a perspective exploded view of an embodiment of the damping element in the turning mechanism according to the invention. The damping element 6 comprises a cylindrical casing 12 inside of which a cylindrical spindle 14 is arranged substantially coaxially. The power element 5 is attached to the spindle 14 with a clamp 15. The fastening between the power element 5 and the spindle 14 is preferably openable, which facilitates the disassembly and service of the turning mechanism. The casing 12 and the spindle 14 are fitted loosely and the clearance fit between them is provided with an elastic medium 13 with certain friction properties. For example, it has been found out that the friction properties of the adhesive material used on double-sided acrylic adhesive tapes 3M™ 9485 and 926 remain substantially the same when the material is used as the elastic medium 13 and when the opening is repeated in the range of $10^5$ times. The adhesive material on both surfaces of the above-mentioned tapes is sticky and detachably adhesive acrylic adhesive which sticks to the inner surface of the casing 12 and to the outer surface of the spindle 14. The elastic medium 13 does not, however, lock the casing 12 and the spindle 14 together but allows their rotation with respect to each other by the power element 5 around the longitudinal axis of the damping element 6. The elastic medium 13 causes friction to the rotary motion, which slows down the turn of the device parts into the use position. Slow opening gives a favourable and sophisticated impression of the function of the device. Furthermore, smooth and controlled stopping of the opening motion substantially reduces the loads directed to the parts and components of the device. One end of the spindle 14 is a shaped pin 16 which is arranged inside the hinge bushings at one end of the device to function as a hinge pin. This solution simplifies the structure of the device because no separate hinge pin is needed. The spindle 14 can also be implemented without a pin 16.

Figure 3:
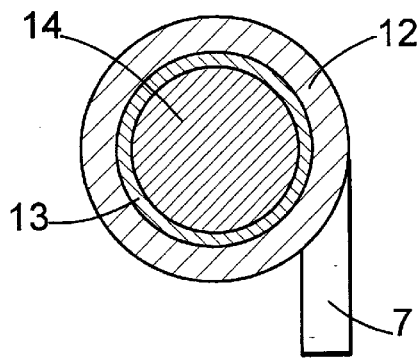
FIG. 3 is a schematic partly cross-sectional view of the damping element shown in FIG. 2.

FIG. 3 is a partly cross-sectional view of the damping element shown in FIG. 2. The elastic medium 13 is placed in the space between the casing 12 and the spindle 14. The friction properties of the damping element can be influenced significantly e.g. by the selection of the material used in the elastic medium 13 and by the dimensions of the casing 12 and the spindle 14. Thus the speed of the opening motion can be adjusted to meet the requirements set by any given application, and the speed of the turning motion can be adjusted as desired. The function of the elastic medium 13 may be based e.g. on its internal friction, i.e. viscosity, elasticity, viscoelasticity, external friction against another material or on a combination thereof. In addition to the above-mentioned acrylic adhesives, other glues and adhesives, organic or inorganic elastomers or elastomer mixtures or other similar materials can be used as the material of the elastic medium 13. The elastic medium 13 can also be fixed substantially immovably either to the inner surface of the casing 12 or to the outer circumference of the spindle 14, in which case the elastic medium 13 causes friction with the surface moving with respect to it as the device is opened, thus slowing down the opening of the device.

If a suitable material is selected for the elastic medium 13, it can also be used for providing the turning motion, in other words the power element 5 can be integrated into the damping element 6. This will further simplify the structure of the turning mechanism 4 and decrease the amount of space needed by it. The power element 5 can be integrated into the damping element 6 by selecting a suitably cross-linked silicone elastomer sheet as the elastic medium 13 and attaching its one end to the spindle 14 and the other end to the casing 12. When the casing 12 is rotated with respect to the spindle 14, tensile stress is generated in the elastomer sheet and the release thereof is prevented e.g. by locking the device 1 parts attached to the casing 12 and the spindle 14 together. When the locking is released, the tension in the elastomer sheet turns the casing 12 with respect to the spindle 14.The desired damping of the turning motion can be achieved e.g. by adjusting the thickness of the elastomer sheet with respect to the clearance fit between the casing 12 and the spindle 14, by placing sticky material that increases friction in the clearance fit or in another suitable manner so that sufficient friction is generated between the surfaces of the sheet and the above-mentioned parts. The power element 5 integrated into the damping element 6 is particularly well suited for turning a light cover or the like, for example.

The casing 12 is preferably made of plastic and the spindle 14 of metal or plastic, but naturally other materials can also be used.

Figure 4:
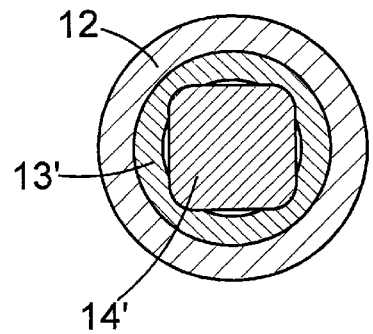
FIG. 4 is a schematic cross-sectional view of a second embodiment of the damping element in the turning mechanism according to the invention.

FIG. 4 is a cross-sectional view of another embodiment of the damping element in the turning mechanism according to the invention. The inner surface of the casing 12 is round as in the embodiments described above. However, the spindle 14 has a substantially quadrangular cross-section with rounded corners. The elastic medium 13' is attached to the inner surface of the casing 12 e.g. by gluing, welding or in another manner known per se. The elastic medium 13' consists of a suitably elastic material, such as cellular rubber or plastic, elastomer or the like. The spindle 14' is dimensioned to allow its corners to compress the elastic medium 13'. The elastic medium 13' resists rotation of the spindle 14' and the parts of the device open slowly into the use position. The spindle 14' does not need to be quadrangular in cross-section, but may also resemble some other polygon. It should be noted that in this application the term 'polygon' refers to any shape of a cross-section on the circumference of which there is at least one protrusion that presses the elastic medium 13' differently than some other section of the circumference. The cross-section does not need to be similar along the whole length of the spindle 14'.

The elastic medium 13' may be integrated into the casing 12 e.g. as follows: the outer part functioning as the casing is made of non-foamed plastic and the inner part functioning as the elastic medium of elastic foamed plastic.

Figure 5:
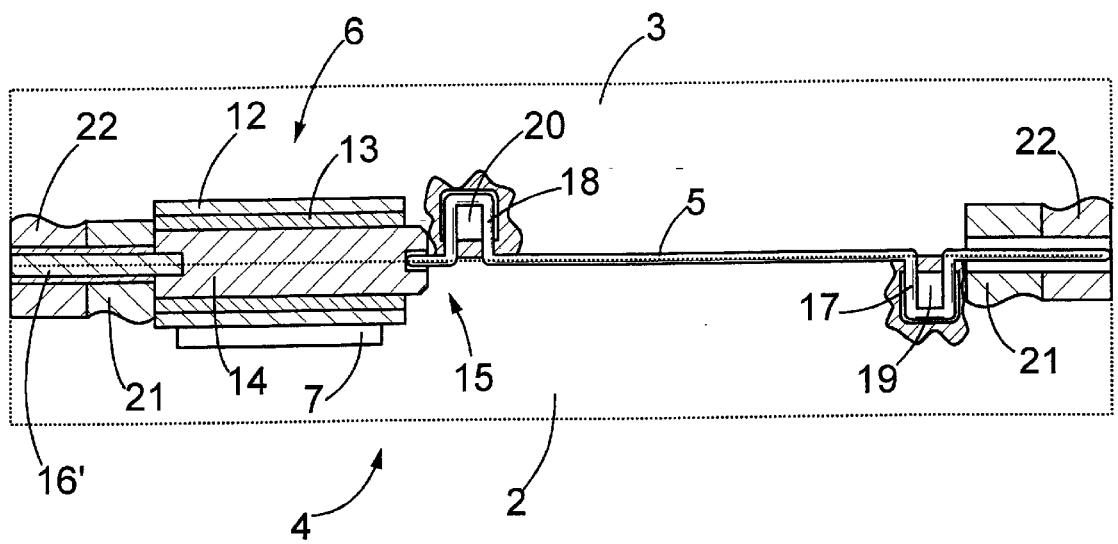
FIG. 5 is a schematic partly sectional side view of a third turning mechanism according to the invention.

FIG. 5 is a partly sectional side view of a third turning mechanism according to the invention in which the device is in the folded position. The turning mechanism 4 comprises a power element 5, which is a torsion spring, and a damping element 6 which lock together substantially immovably at a clamp 15. The damping element 6 is preferably fixed detachably to the base part with a clamp 7. The torsion spring is provided with two bends of which the first bend 17 is fixed substantially immovably to a first counterpart 19 mounted in the base part 2 and the second bend 18 in the same way to a second counterpart 20 mounted in the cover part 3. The counterparts 19 and 20 are pocket-like structures inside of which the bends 17 and 18 are simply pushed during the assembly. An advantage of these counterparts is that they enable quick installation of the torsion spring. Furthermore, they are relatively simple to produce. The turning mechanism can also be attached to the device parts 2 and 3 inversely, i.e. the damping element 6 and the first bend 17 can be attached to the cover part 3 and the second bend 18 to the base part 2.

In the folded position shown in FIG. 5 the torsion spring is tense between the bends 17 and 18. The bends 17 and 18 tend to rotate in the opposite directions with respect to each other around the longitudinal axis of the torsion spring upwards from the level shown in the figure, but the locking between the parts 2 and 3 prevents this. When the device parts are released from the locking, the torsion spring can rotate towards its relaxed position; at the same time the spring force rotates the parts 2 and 3 attached to the bends 17 and 18 by the counterparts 19 and 20 with respect to each other. The spindle 14 attached to the torsion spring rotates inside the casing 12 along with the second bend 18 and the cover part 3. The friction caused by the elastic medium 13 between the casing 12 and the spindle 14 slows down the turning motion of the cover part 3 attached to the second bend 18.

One end of the spindle 14 is provided with a pin 16', which extends to one end of the device inside the hinge bushings 21, 22 and functions as the hinge pin of these hinge bushings. At the opposite end of the device the end of the torsion spring functions as a hinge pin. It is also possible that the hinge elements of the device and their hinge pins and other similar parts are totally separate from the turning mechanism 4.

Figure 6:
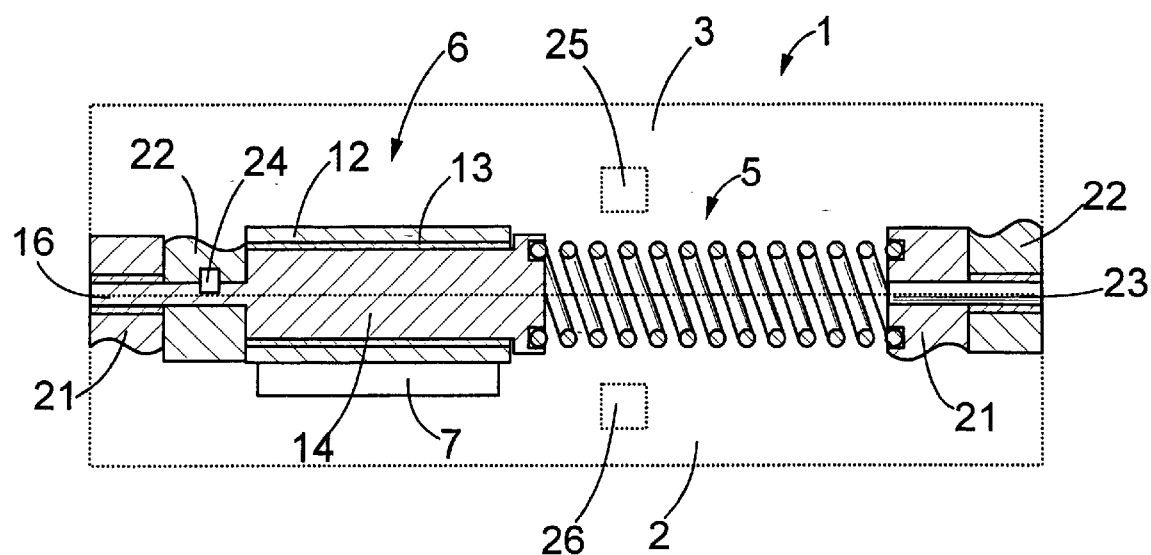
FIG. 6 is a schematic partly sectional side view of a fourth turning mechanism according to the invention.

FIG. 6 is a partly sectional side view of a fourth turning mechanism according to the invention in which the device is in the folded position. In principle this embodiment is similar to the embodiment shown in FIG. 5 but the power element 5 is a coil spring one end of which is attached to the spindle 14 of the damping element 6 and the opposite end to the hinge bushing 21 of the base part 2 in the device. Furthermore, the turning mechanism is arranged to close the first part 2 and the second part 3 of the device to fold them against each other as shown in the figure, i.e. contrary to the embodiments shown in the preceding figures. Any known spring member which is arranged to turn the parts 2 and 3 of the device 1 with respect to each other can be used as the power element 5. The casing 12 of the damping element 6 is attached to the base part 2 and the spindle to the cover part 3 with a locking member 24. The locking member 24 is e.g. a screw, wedge, rivet or another attachment member known per se. The spindle 14 can also be attached to the cover part 3 by gluing, welding, pressing, shaping the parts or in another similar manner; the spindle 14 can also be attached from some other part. For keeping the device 1 in the use position it is provided with locking members 25, 26 which are known per se by a person skilled in the art and will thus not be described more closely here.

In the position shown in the figure the spring is substantially relaxed. When the parts 2 and 3 are turned into the use position, the spring tenses up. When the parts are released from the locking of the locking members 25, 26, the spring force rotates the spindle and the cover part 3 attached thereto with respect to the base part 2. The elastic medium 13 slows down the turning motion as was described in connection with the preceding figures.

The drawings and the description related thereto are only intended to illustrate the inventive concept. The details of the invention may vary within the scope of the claims. Thus it is not necessary to attach the power element 5 directly to the spindle 14, 14' but the power element 5 may be an entity separate from the damping element 6 which generates the opening force needed, and the spindle 14, 14' and the casing may be attached to different parts 2 and 3 of the device. In addition, the device may comprise more than two parts arranged to turn with respect to each other as well as screens and keyboards mounted in the exterior sides of the device. The angle between the device parts 2 and 3 in the use position can be adjusted as desired by adjusting the characteristics of the turning mechanism.

What is claimed is:

1. A turning mechanism for generating a turning motion, the mechanism comprising at least one power element, which is arranged to generate a turning force for the turning motion, and at least one damping element, which is arranged to control a speed of the turning motion, wherein the damping element comprises a substantially cylindrical casing, a spindle mounted inside the casing using a clearance fit, the spindle being connected to the power element to allow relative rotational movement between the spindle and the casing along with the turning motion, and that the clearance fit between the casing and the spindle is provided with an elastic medium which controls the turning motion of the casing with respect to the spindle and dampens a stopping of said turning motion.

2. A turning mechanism according to claim 1, wherein the power element is a spring.

3. A turning mechanism according to claim 2, wherein the power element is a torsion spring which is arranged substantially parallel with the damping element.

4. A turning mechanism according to claim 2, wherein the power element is a coil spring which is arranged substantially parallel with the damping element.

5. A turning mechanism according to claim 1, wherein the elastic medium is also arranged to function as the power element.

6. A turning mechanism according to claim 1, wherein the spindle is substantially round in cross-section and the elastic medium is arranged to fill substantially the whole clearance fit between the casing and the spindle.

7. A turning mechanism according to claim 6, wherein a material of the elastic medium contains acrylic adhesive.

8. A turning mechanism according to claim 7, wherein the elastic medium is double-sided acrylic adhesive tape.

9. A turning mechanism according to claim 1, wherein the spindle is substantially polygonal in cross-section and that the elastic medium is elastic material against which corners of the spindle are pressed.

10. A turning mechanism according to claim 9, wherein the material of the elastic medium is foamed plastic.

11. A turning mechanism according to claim 1, wherein the power element is attached to the spindle.

12. A turning mechanism according to claim 11, wherein the power element is fixed detachably to the spindle.

13. A turning mechanism according to claim 1, wherein the turning mechanism is arranged to perform an opening motion.

14. A turning mechanism according to claim 1, wherein the turning mechanism is arranged to perform a closing motion.

15. A hinged electronic device comprising at least a first part and a second part arranged to turn with respect to the first part, wherein the device comprises a turning mechanism for turning the first part with respect to the second part, the turning mechanism comprising a power element which is arranged to generate a turning force for a turning movement, and a damping element which is arranged to control a speed of a turning motion, the damping element comprising a substantially cylindrical casing inside of which a spindle is mounted using a clearance fit, the spindle being connected to the power element to allow the spindle to rotate with respect to the casing along with the turning motion, and that a clearance fit between the casing and the spindle is provided with an elastic medium which controls the turning motion of the casing with respect to the spindle and dampens a stopping of the turning motion.

16. An electronic device according to claim 15, wherein the power element is a spring.

17. An electronic device according to claim 16, wherein the power element is a torsion spring arranged substantially parallel with the damping element.

18. An electronic device according to claim 16, wherein the power element is a coil spring arranged substantially parallel with the damping element.

19. An electronic device according to claim 15, wherein the elastic medium is also arranged to function as the power element.

20. An electronic device according to claim 15, wherein the spindle is substantially round in cross-section and that the elastic medium is arranged to fill substantially the whole clearance fit between the casing and the spindle.

21. An electronic device according to claim 15, wherein the spindle is substantially polygonal in cross-section, and the elastic medium is an elastic material against which protrusions of the spindle are pressed.

22. An electronic device according to claim 15, wherein the elastic material of the elastic medium contains acrylic adhesive.

23. An electronic device according to claim 15, wherein the elastic material of the elastic medium contains foamed plastic.

24. An electronic device according to claim 15, wherein the power element is attached to the spindle.

25. An electronic device according to claim 24, wherein the power element is fixed detachably to the spindle.

26. An electronic device according to claim 15, wherein a hinge pin is integrated into the power element.

27. An electronic device according to claim 15, wherein a hinge pin is integrated into the spindle.

28. An electronic device according to claim 15, wherein the casing is attached to a base part of the device.

29. An electronic device according to claim 15, wherein the casing is attached to a cover part of the device.

30. An electronic device according to claim 15, wherein the turning mechanism is arranged to open the device.

31. An electronic device according to claim 30, further comprising openable locking members for locking the first part and the second part into a folded position.

32. An electronic device according to claim 15, wherein the turning mechanism is arranged to close the device.

33. An electronic device according to claim 32, further comprising openable locking members for locking the first part and the second part into a use position.

* * * * *